United States Patent [19]

Plockl

[11] 3,746,868

[45] July 17, 1973

[54] CORRECTION APPARATUS FOR OPTICAL READING MECHANISM

[75] Inventor: Johann Plockl, Unterhaching, Germany

[73] Assignee: Zellweger AG, Uster, Switzerland

[22] Filed: Jan. 28, 1972

[21] Appl. No.: 221,705

[30] Foreign Application Priority Data

Mar. 22, 1971 Switzerland .......................... 4240/71

[52] U.S. Cl. ........ 250/219 Q, 178/7.6, 235/61.11 E, 250/226

[51] Int. Cl. ....... G01n 21/30, G01j 3/34, H04n 3/00

[58] Field of Search ......... 250/226, 219 D, 219 CR, 250/219 Q, 219 QA; 235/61.11 E; 178/7.6; 350/285, 317

[56] References Cited

UNITED STATES PATENTS 3,127,517 3/1964 Kestenbaum .................. 250/226 X

*Primary Examiner*—James W. Lawrence
*Assistant Examiner*—T. N. Grigsby
*Attorney*—Werner W. Kleeman

[57] ABSTRACT

A correction apparatus for an optical reading mechanism wherein at least two line filters arranged in intersecting planes are disposed between a scanning track and a receiver.

5 Claims, 3 Drawing Figures

CORRECTION APPARATUS FOR OPTICAL READING MECHANISM

BACKGROUND OF THE INVENTION

The present invention relates to a new and improved correction apparatus for an optical reading mechanism.

Optical reading mechanisms are known to the art wherein a moving light beam produces a scanning trace upon an article or object to be read-out. A light spot appears at the point of impact or impingement of the light beam upon the object. At least a portion of the light reflected by this light spot is delivered to a photoelectric receiver.

With reading mechanisms of the aforementioned type it is desired that there be obtained a constant output signal of the photoelectric receiver when scanning a surface of uniform reflection capability. However, in practice, this desired uniformity of the output signal of the photoelectric receiver cannot readily be attained throughout the entire scanning region. In particular, when the scanning light beam impinges in an oblique position externally of the plane of symmetry of the apparatus it is possible for both the brightness or intensity of the produced scanning light spot as well as also the light current delivered from a lateral position to the photoelectric receiver to be weaker than in the central position of the scanning beam.

It is already known to the art to arrange a diaphragm having an angular-dependent opening between the scanning trace and the photoelectric receiver for the purpose of compensating for such light fluctuations. One such type prior art device has been disclosed, for instance, in German Patent Publication No. 1,193,701.

SUMMARY OF THE INVENTION

The primary objective of this invention is to provide a different solution for the aforementioned problem.

A further significant object of the present invention relates to a new and improved correction apparatus for an optical reading mechanism or reader which effectively compensates for light fluctuations in an extremely reliable and accurate manner.

Now, in order to implement these and still further objects of the present invention, which will become more readily apparent as the description proceeds, the inventive correction apparatus for an optical reading mechanism is manifested by the features that at least two line filters are arranged in intersecting planes between the scanning trace and the photoelectric receiver.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
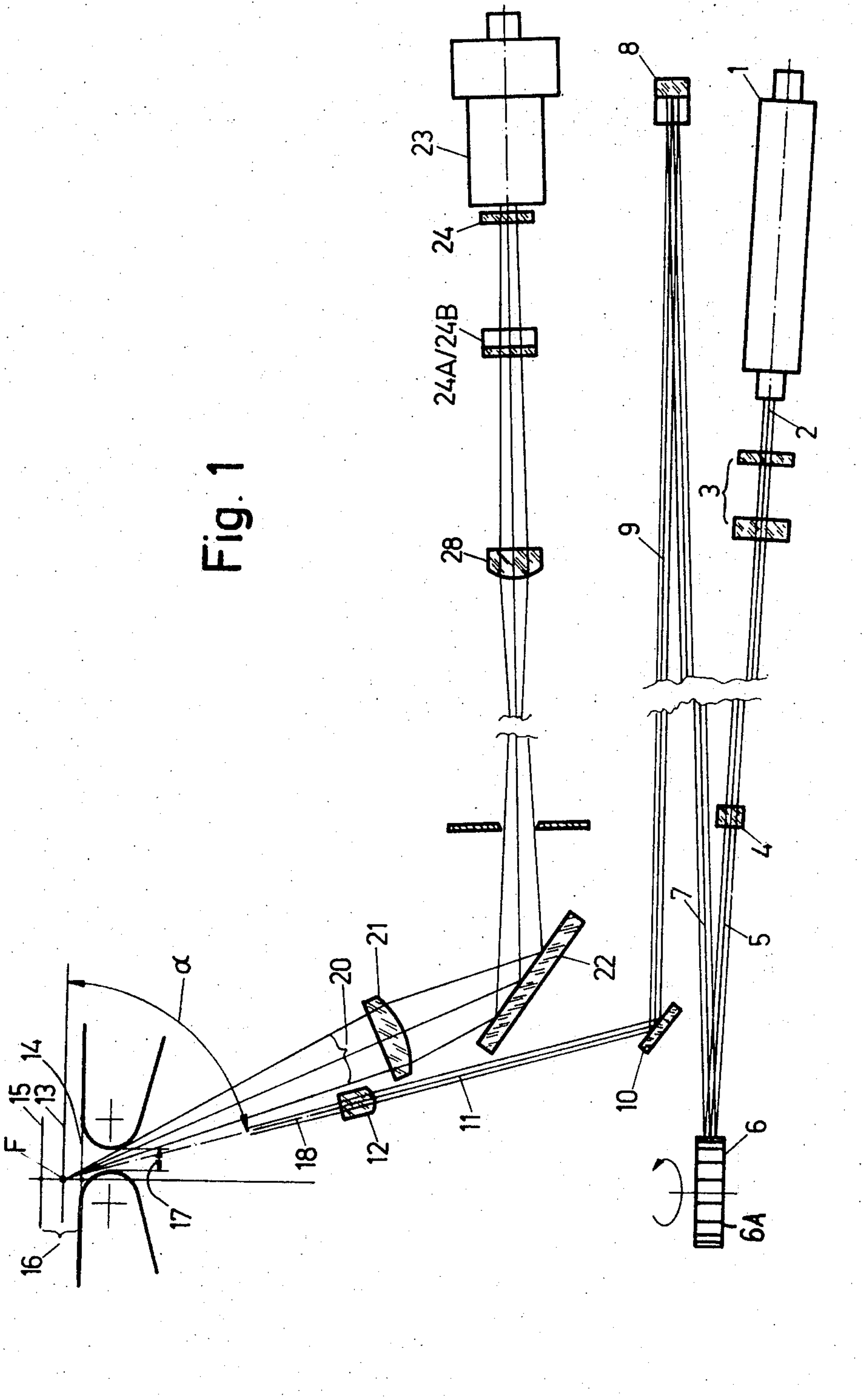
FIG. 1 is a sectional view through the vertical plane of symmetry of a preferred constructional embodiment of reader mechanism employing the correction apparatus of this development.

Considering now the drawings, in FIG. 1 thereof there is illustrated in sectional view through the vertical plane of symmetry a reading mechanism with which the inventive correction apparatus is employed. Since the reader mechanism as such constitutes subject matter of other commonly assigned, copending United States applications, such as for instance Ser. No. 221,706, filed Jan. 28, 1972, and entitled "Reader Mechanism For Optically Discernible Characters", and Ser. No. 221,702, filed Jan. 28, 1972, and entitled "Reading Apparatus For Optically Discernible Characters", only enough of the structure and operation thereof will be considered herein to enable one skilled in the art to readily understand the underlying concepts of the development of this disclosure relating to the correction apparatus for such type reader. Hence, it will be seen that the construction illustrated in FIG. 1 embodies a light source 1, in particular a laser such as a helium gas laser, which transmits a fine approximately parallel transmitted light beam 2. In the path of the transmitted beam 2 there can be arranged an image reproduction system 3 or a collimator, which projects the transmitted light beam 2 towards a first cylindrical lens member 4. This first cylindrical lens member 4 transmits a light beam 5 which converges in a plane in the direction of a beam deflecting mechanism 6. This beam deflecting mechanism 6 can be, for instance, a reflector or mirror wheel having prismatically arranged mirror surfaces or it can also be an oscillating mirror system, generally indicated by reference character 6A. Oscillating mirror systems are known from the art of galvanometers and loop oscillographs.

Continuing, it should be remarked that by providing a slight inclined or oblique delivery of the light beam 5 to the beam deflecting mechanism 6 it is possible to achieve the result that a further light beam 7, reflected by the beam deflecting mechanism 6, will be deflected or pivoted so as to move externally of the first cylindrical lens member 4 and therefore this reflected light beam will not be influenced or otherwise affected by such cylindrical lens member 4. The deflected beam of light 7 can be projected directly towards a reference plane 13. This reference plane has associated therewith a spatial tolerance region or zone 16 within which is disposed or moved a character which is to be recognized or read-out as will be discussed more fully hereinafter. However, it is advantageous to initially deliver the deflected beam of light 7 to a hollow mirror 8. Hollow mirror 8 possesses a curvature such that the light beam 9 reflected therefrom experiences an at least approximately parallel displacement when the light beam 7 is deflected over the reflector or mirror surface of the hollow mirror 8. The light beam 9 can be directly projected towards the reference plane 13, but it is however more advantageous to transmit light beam 9 through the agency of a deflecting mirror 10 at an acute angle $\alpha$ towards the reference plane 13, as best recognized by referring to FIG. 1.

Now in the path of the light beam 11 which is transmitted from the deflecting mirror 10 there can be advantageously arranged a transmitting cylindrical lens member 12 which focuses the light beam 11 at the focal point F. This focal point F is disposed for instance in the reference plane 13. Depending upon the given spatial arrangement of the entire optical system it also can be advantageous to locate the focusing or focal point F within the tolerance region 16 related to the reference plane 13 and specifically between an inner boundary plane 14 and an outer boundary plane 15 defining such spatial tolerance range 16. This spatial tolerance range 16 which is located between the planes 14 and 15 preferably corresponds to the depth of focus region or definition depth of the optical system.

The spatial tolerance range 16 bounded by both of these planes 14 and 15 is located, for instance, externally of a read-out gap or space 17. This gap or space 17 can be, for instance, formed by an interruption in a suitable article conveying mechanism wherein, for example, in the plane 14 there are located conveying bands or belts which serve to transport an article provided with a character which is to be recognized or read-out over the gap 17. Instead of using the conveying mechanism it would be also possible to employ a plate having a slot defining the gap 17 and approximately arranged at the height of the inner boundary plane 14.

The character to be recognized is impinged by the transmitted scanning beam 18 which is projected through the gap or slot 17 and which departs from the transmitting cylindrical lens member 12. A portion of the light reflected by the article character impinges, in the form of a received light beam 20, at a receiving cylindrical lens member 21 and is preferably delivered via a mirror 22 and, if desired, through the agency of an image-reproducing mechanism 28, for instance a further cylindrical lens member, to a suitable receiver or receiver mechanism 23, for instance a photoelectronic or photoelectric multiplier. When utilizing at least approximately monochromatic light, such as delivered for instance by a laser, it is advantageous to arrange in front of the photoelectric receiver 23 a narrow-band filter 24, for instance, a socalled line filter, for the purpose of improving the signal-noise ratio. However, a drawback of the aforementioned line filter resides in the fact that its light permeability is markedly dependent upon the angle of incidence of the light impinging upon such line filter.

Now with reader mechanisms of the aforementioned type the received light beam 20 arrives in particular from the terminal positions of the scanning range at a considerable angle of inclination with regard to the axis of the line filter 24, at the latter which is arranged directly in front of the receiver 23. This greatly intensifies fluctuations of the output signal of the receiver 23 during one pass of the scanning trace upon a uniformly reflecting surface. The uniformity of the output signal of the photoelectric receiver over the entire scanning range is therefore not insured for in any way.

Figure 2:
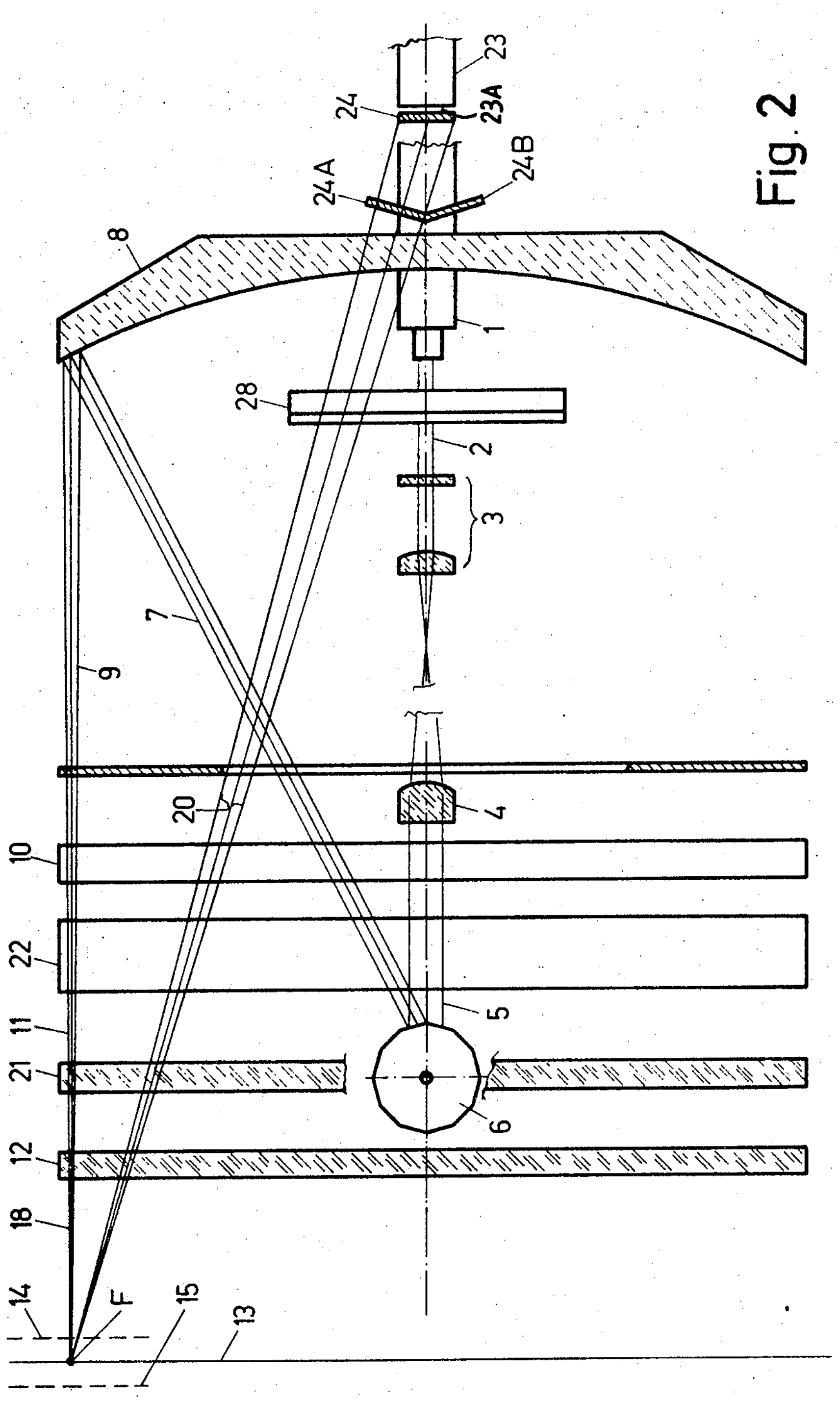
FIG. 2 is a plan view of a portion of the reader mechanism depicted in FIG. 1 on an enlarged scale.

The disadvantageous characteristic of the line filter with regard to the strong dependency of its light permeability upon the angle of incidence of the light can be now utilized according to the teachings of this invention in order to prevent to a considerable degree the aforementioned fluctuations of the output signal during article scanning. Correction of the light delivered to the receiver 23 is undertaken by the teachings of this invention in that in the path of the light rays of the light delivered from the scanned character to the receiver 23 there are arranged at least two line filters 24A and 24B in such a manner that their axes of greatest permeability extend at an acute angle with respect to one another. Such arrangement of the line filters, as contemplated by the teachings of this development, is best recognized by referring to FIG. 2 wherein there is depicted in plan view the receiver portion of the described reader or reader mechanism.

Figure 3:
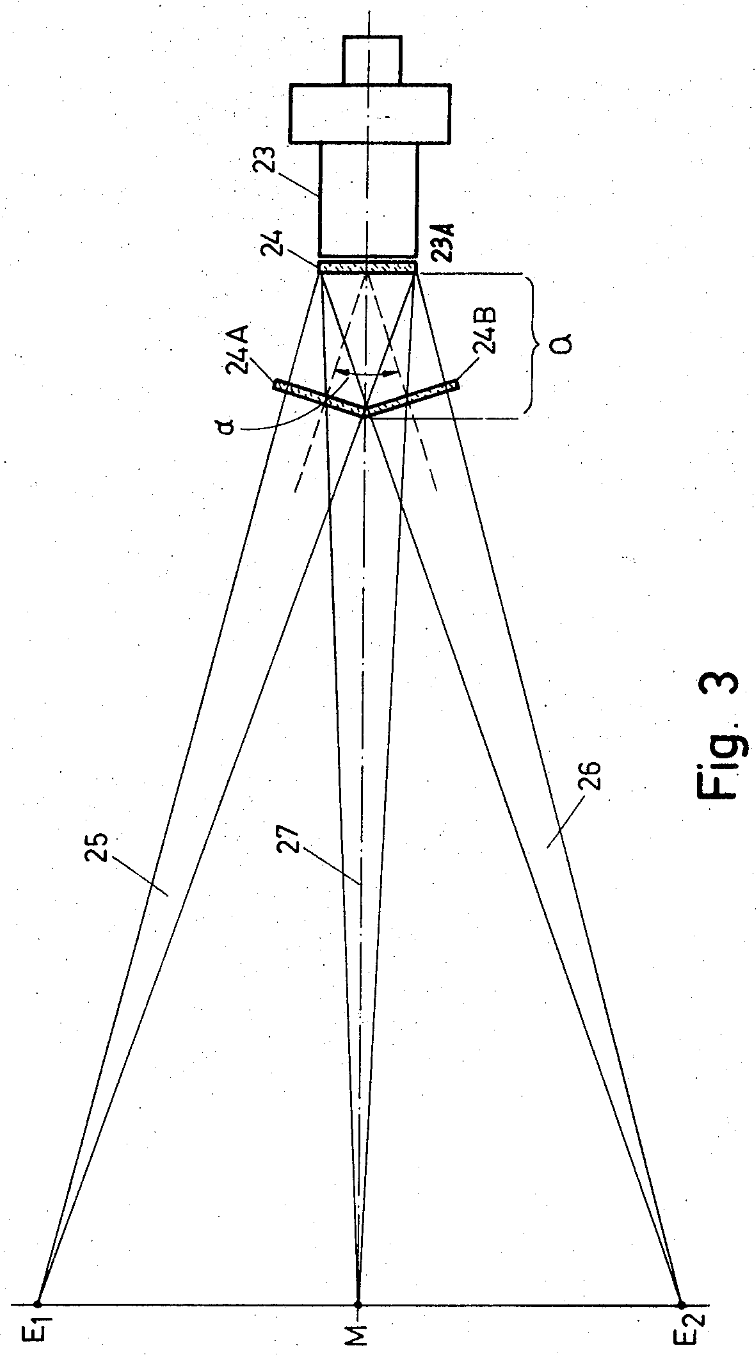
FIG. 3 is a plan view schematically illustrating further details of the inventive correction apparatus for the optical reader depicted in FIGS. 1 and 2.

Both of the line filters 24A and 24B will be seen to be arranged between the receiver 23 and the mirror or reflector 22 and their axes of greatest permeability extend at an angle $\alpha$ with respect to one another, as also clearly indicated in FIG. 3.

From FIG. 3 it will be apparent that from the one extreme position E1 of the scanning point a received light beam 25 arrives at the receiver 23 whereas from the other oppositely disposed extreme position E2 a received light beam 26 arrives at the receiver 23. Both of the line filters 24A and 24B are now arranged in such a manner in front of the receiver 23 that in each instance as great as possible quantity of the entire received light beams 25 and 26 respectively are delivered to the opening of the receiver 23. It is also to be recognized from FIGS. 2 and 3 that the axis of greatest light passage or permeability of the line filter 24A is directed towards one extreme position $E_1$ whereas the axis of greatest light passage or permeability of the other line filter 24B is directed towards the other extreme position E2. Hence, from the extreme positions E1 and E2 a maximum light current or flow falls through the respective line filters 24A and 24B associated with such respective extreme positions and falls essentially completely at the inlet opening 23A of the receiver 23. Since from the extreme positions E1 and E2 less light is reflected than from the middle or central position M this effect is very desirable. From the central position of the scanning range or zone, in other words for instance from the point M at the center of the scanning trace or track, the scanning light spot becomes brighter owing for instance to the more inclined incidence of the scanning beam and it reflects a greater light current towards the receiver 23. The received light beam 27 emanating from point M, has approximately one-half thereof passing through the line filter 24A and approximately the other half thereof passes through the line filter 24B. Further, the axes of greatest light passage of these line filters will be seen from FIG. 3 to be arranged for instance in a pair symmetrically with respect to the connection line of the central point of the scanning track with the central point of the opening of the receiver.

It should now be readily apparent that the received light beam 27 emanating from point M passes at an inclination through both the line filter 24A and also through the line filter 24B which, owing to the angle-dependency of the light permeability of both such line filters produces a pronounced weakening of the received light beam 27 emanating from point M. Thus whereas both of the received light beams 25 and 26 are not appreciably weakened from the lateral positions, on the other hand, the central light beam 27 is considerably weakened. In this manner there is realized compensation of the light flow or current during throughpassage of the scanning track or trace.

Naturally, two such arranged line filters only provide a coarse compensation of the incidence of light. With a greater number of line filters arranged in pairs and always inclined to the same degree away from the central axis it is possible to still even further improve the uniformity of the light delivered to the receiver 23. Suitable as the line filters are, for instance, those which can be commercially obtained from the European concern Balzers located at Balzers, Principality of Lichtenstein, and sold under their commercial designation Type B 40-631-10 or comparable line filters.

While there is shown and described present preferred embodiments of the invention, it is to be distinctly understood that the invention is not limited thereto but may be otherwise variously embodied and practiced within the scope of the following claims.

Accordingly What is claimed is:

1. For use with an optical reading mechanism having a scanning track and a receiver with an inlet opening, a correction apparatus for such optical reading mechanism which comprises at least two line filters arranged in intersecting planes between the scanning track and the receiver, said intersecting planes enclosing an angle with respect to one another which is greater than 90°, said two line filters in said intersecting planes compensating for fluctuations in the intensity of the light delivered to the receiver.

2. For use with an optical reading mechanism having a scanning track and a receiver with an inlet opening, a correction apparatus for such optical reading mechanism which comprises at least two line filters arranged in intersecting planes between the scanning track and the receiver, the axis of greatest light passage of one of the line filters is at least approximately directed towards one end of the scanning track and that of the other line filter at least approximately towards the other end of the scanning track.

3. For use with an optical reading mechanism having a scanning track and a receiver with an inlet opening, a correction apparatus for such optical reading mechanism which comprises at least two line filters arranged in intersecting planes between the scanning track and the receiver, the axes of greatest light passage of said line filters are disposed in a pair substantially symmetrically with respect to the connection line of the central point of the scanning track with the central point of the opening of the receiver.

4. For use with an optical reading mechanism having a scanning track and a receiver with an inlet opening, a correction apparatus for such optical reading mechanism which comprises at least two line filters arranged in intersecting planes between the scanning track and the receiver, said line filters are disposed such that the light emanating from each of the line filters falls essentially completely at the inlet opening of the receiver.

5. For use with an optical reading mechanism having a scanning track and a receiver with an inlet opening, a correction apparatus for such optical reading mechanism which comprises at least two line filters arranged in intersecting planes between the scanning track and the receiver, the axis of greatest light passage of said line filters is located externally of the plane of symmetry taken through the central point of the scanning track and the center of the inlet opening of the receiver.

* * * * *